United States Patent
Vassilyev et al.

(10) Patent No.: US 11,743,686 B2
(45) Date of Patent: Aug. 29, 2023

(54) ALIGNING IN-VEHICLE MOBILE DEVICE AND VEHICLE BODIES FOR IMPROVED GLOBAL POSITIONING

(71) Applicant: HERE Global B.V., Eindhoven (NL)

(72) Inventors: Artem Vassilyev, Tampere (FI); Pavel Ivanov, Tampere (FI); Stanislav Krainikov, Tampere (FI); Tatiana Vyunova, Tampere (FI)

(73) Assignee: HERE Global B.V., Eindhoven (NL)

( * ) Notice: Subject to any disclaimer, the term of this patent is extended or adjusted under 35 U.S.C. 154(b) by 329 days.

(21) Appl. No.: 17/104,140

(22) Filed: Nov. 25, 2020

(65) Prior Publication Data

US 2022/0167121 A1    May 26, 2022

(51) Int. Cl.
| | |
|---|---|
| *H04W 4/029* | (2018.01) |
| *G06F 16/29* | (2019.01) |
| *G01C 25/00* | (2006.01) |
| *G01S 19/14* | (2010.01) |
| *G01S 19/23* | (2010.01) |
| *G06F 3/0482* | (2013.01) |
| *H04W 64/00* | (2009.01) |
| *G01S 19/48* | (2010.01) |

(52) U.S. Cl.
CPC .......... *H04W 4/029* (2018.02); *G01C 25/005* (2013.01); *G01S 19/14* (2013.01); *G01S 19/235* (2013.01); *G06F 3/0482* (2013.01); *G06F 16/29* (2019.01); *H04W 64/003* (2013.01); *G01S 19/48* (2013.01)

(58) Field of Classification Search
CPC .. H04W 4/029; H04W 64/003; G01C 25/005; G01S 19/14; G01S 19/235; G01S 19/48; G01S 19/40; G06F 3/0482; G06F 16/29
See application file for complete search history.

(56) References Cited

U.S. PATENT DOCUMENTS

| | | | |
|---|---|---|---|
| 2013/0113993 A1* | 5/2013 | Dagit, III | G06F 3/04883 348/734 |
| 2014/0288825 A1 | 9/2014 | Czompo et al. | |
| 2016/0095045 A1* | 3/2016 | Salomon | H04W 4/40 455/411 |
| 2017/0059326 A1 | 3/2017 | Zhang | |
| 2017/0345307 A1 | 11/2017 | Fan et al. | |
| 2018/0059913 A1* | 3/2018 | Penilla | H04L 63/0861 |
| 2020/0233096 A1* | 7/2020 | Hazlett | G01S 17/42 |
| 2022/0146693 A1* | 5/2022 | Nakagawa | G01S 19/49 |

OTHER PUBLICATIONS

Extended European Search Report for European Application No. 21209573.1 dated May 9, 2022, 6 pages.

* cited by examiner

*Primary Examiner* — Brandon J Miller
(74) *Attorney, Agent, or Firm* — ALSTON & BIRD LLP

(57) ABSTRACT

One or more processors obtain an indication of user input identifying a position of a mobile device within a vehicle. The processor(s) obtain a location of the mobile device with respect to a coordinate system that is independent of the vehicle. The processor(s) determine a location of the vehicle with respect to the coordinate system based at least in part on the location of the mobile device and the identified position of the mobile device within the vehicle. The location of the vehicle with respect to the coordinate system may be determined to sub-meter accuracy.

20 Claims, 6 Drawing Sheets

ALIGNING IN-VEHICLE MOBILE DEVICE AND VEHICLE BODIES FOR IMPROVED GLOBAL POSITIONING

TECHNOLOGICAL FIELD

An example embodiment relates generally to positioning. In particular, an example embodiment generally relates to positioning of a vehicle.

BACKGROUND

In various scenarios, a mobile device may be onboard a vehicle and may be used to perform positioning and/or navigation-related functions corresponding to the vehicle and/or travel of the vehicle. Conventionally, in such scenarios, the location of the vehicle is assumed to be the same as the location of the mobile device.

BRIEF SUMMARY

Traditional Global Navigation Satellite Systems (GNSS) enable positioning of a mobile device with an accuracy of approximately five meters. Thus, in applications where traditional GNSS positioning is performed by a mobile device onboard a vehicle to determine the location of the vehicle, the location of the vehicle is generally assumed to be the location of the mobile device. For example, the uncertainty in the location of the vehicle introduced by assuming the location of the mobile device onboard the vehicle is aligned with the location of the vehicle is small compared to the uncertainty in the GNSS-determined location of the mobile device.

When GNSS positioning is enabled with a sub-meter accuracy (e.g., half a meter), the uncertainty introduced by assuming the location of a mobile device onboard the vehicle aligns with the location of the vehicle becomes greater than the uncertainty of the GNSS-determined location of the mobile device. Embodiments of the present disclosure provide techniques, user interfaces, and/or the like, for determining a location of a vehicle based on a GNSS-determined location of a mobile device onboard the vehicle with sub-meter accuracy.

Various embodiments provide methods, apparatus, systems, and computer program products for increasing the accuracy and/or decreasing the uncertainty in a location of a vehicle determined based on determined location of a mobile device onboard the vehicle. For example, the mobile device may be a GNSS-enabled smartphone configured to perform one or more positioning and/or navigation-related functions using a location of the vehicle determined based on a GNSS-determined location of the mobile device. For example, an indication of user input may be received that identifies and/or indicates a position of the mobile device within the vehicle. For example, a relative position of the mobile device compared to a reference point, plane, axis, and/or the like of the vehicle may be determined based on the received indication of user input. In an example embodiment, the location of the mobile device with respect to a coordinate system that is independent of the vehicle is determined. For example, the location of the mobile device may be determined using a GNSS sensor of and/or associated with the mobile device. The location of the vehicle may then be determined based on the location of the mobile device with respect to the coordinate system that is independent of the vehicle and the position of the mobile device within the vehicle (e.g., with respect to the reference point, plane, axis, and/or the like of the vehicle). One or more positioning and/or navigation-related functions may then be performed based on the determined location of the vehicle. For example, a map portion may be displayed (e.g., via a user interface of the mobile device) with a vehicle indicator displayed on the map portion indicating the location of the vehicle.

In an example embodiment, one or more processors of a mobile device or network device obtains an indication of user input identifying a position of a mobile device within a vehicle; obtains a location of the mobile device with respect to a coordinate system that is independent of the vehicle; and determines a location of the vehicle with respect to the coordinate system based at least in part on the location of the mobile device and the identified position of the mobile device within the vehicle.

In an example embodiment, one or more processors of a mobile device or network device causes a mobile device to display an interactive user interface (IUI). The IUI comprises one or more interface features. The one or more interface features are configured to enable selection of a vehicle portion corresponding to a position of the mobile device within a vehicle. The one or more processors receive, via interaction with at least one of the one or more interface features, selection of a first vehicle portion. The selection of the first vehicle portion indicates that the mobile device is positioned within the first vehicle portion within the vehicle. The one or more processors determine a location of the vehicle with respect to a coordinate system that is independent of the vehicle based at least in part on the first vehicle portion.

According to an aspect of the present disclosure, a method for determining a location of a vehicle with respect to a coordinate system that is independent of the vehicle is provided. In an example embodiment, the method comprises obtaining, by one or more processors an indication of user input identifying a position of a mobile device within a vehicle; obtaining, by the one or more processors, a location of the mobile device with respect to a coordinate system that is independent of the vehicle; and determining, by the one or more processors, a location of the vehicle with respect to the coordinate system based at least in part on the location of the mobile device and the identified position of the mobile device within the vehicle.

In an example embodiment, the user input is received by the mobile device via user interaction with at least one input device of the user interface. In an example embodiment, the at least one input device being one of (a) a touch display or (b) a microphone. In an example embodiment, the input of user input is accessed from a user profile stored in a memory of at least one of (a) the mobile device or (b) accessible to the processor. In an example embodiment, the processor is a component of one of (a) the mobile device or (b) a network device. In an example embodiment, the location of the mobile device with respect to the coordinate system is determined by a global navigation satellite system (GNSS) sensor of the mobile device. In an example embodiment, the location of the mobile device with respect to the coordinate system is known to sub-meter accuracy. In an example embodiment, the location of the vehicle with respect to the coordinate system is used to perform at least one positioning-related or navigation-related function. In an example embodiment, the method further comprises at least one of (a) causing display of a symbol via an interactive user interface of a device indicating the location of the vehicle with respect to the coordinate system; or (b) performing one or more positioning-related or navigation-related functions based on the location of the vehicle with respect to the coordinate system. In an example embodiment, the method further comprises determining an offset of the mobile device from at least one of a reference point, axis, or plane of the vehicle based on the position of the mobile device within the vehicle, wherein determined offset is used to determine the location of the vehicle with respect to the coordinate system. In an example embodiment, the at least one of the reference point, axis, or plane is a center point, midline axis, or midline plane of the vehicle, respectively. In an example embodiment, the method further comprises obtaining an indication of further user input indicating a changed position of the mobile device within the vehicle; determining a changed offset of the mobile device from at least one of the reference point, axis, or plane of the vehicle based on the changed position of the mobile device within the vehicle; determining a changed location of the vehicle with respect to the coordinate system based at least in part on the location of the mobile device and the determined changed offset; and providing the changed location of the vehicle with respect to the coordinate system such that the user interface of the mobile device displays the symbol indicating the changed location of the vehicle with respect to the coordinate system. In an example embodiment, the indication of the user input identifies a region within the vehicle that the mobile device is positioned at within the vehicle and the position of the mobile device within the vehicle is determined based at least in part on the identified region. In an example embodiment, the position of the mobile device within the vehicle is determined to be a center point of the identified region.

According to another aspect of the present disclosure, an apparatus (e.g., mobile device and/or network device) is provided. In an example embodiment, the apparatus comprises at least one processor and at least one memory storing computer program code. The at least one memory and the computer program code are configured to, with the processor, cause the apparatus to at least obtain an indication of user input identifying a position of a mobile device within a vehicle; obtain a location of the mobile device with respect to a coordinate system that is independent of the vehicle; and determine a location of the vehicle with respect to the coordinate system based at least in part on the location of the mobile device and the identified position of the mobile device within the vehicle.

In an example embodiment, the user input is received by the mobile device via user interaction with at least one input device of the user interface. In an example embodiment, the at least one input device being one of (a) a touch display or (b) a microphone. In an example embodiment, the input of user input is accessed from a user profile stored in a memory of at least one of (a) the mobile device or (b) accessible to the processor. In an example embodiment, the processor is a component of one of (a) the mobile device or (b) a network device. In an example embodiment, the location of the mobile device with respect to the coordinate system is determined by a global navigation satellite system (GNSS) sensor of the mobile device. In an example embodiment, the location of the mobile device with respect to the coordinate system is known to sub-meter accuracy. In an example embodiment, the location of the vehicle with respect to the coordinate system is used to perform at least one positioning-related or navigation-related function. In an example embodiment, the at least one memory and the computer program code are further configured to, with the processor, cause the apparatus to perform at least one of (a) causing display of a symbol via an interactive user interface of a device indicating the location of the vehicle with respect to the coordinate system; or (b) performing one or more positioning-related or navigation-related functions based on the location of the vehicle with respect to the coordinate system. In an example embodiment, the at least one memory and the computer program code are further configured to, with the processor, cause the apparatus to at least determine an offset of the mobile device from at least one of a reference point, axis, or plane of the vehicle based on the position of the mobile device within the vehicle, wherein determined offset is used to determine the location of the vehicle with respect to the coordinate system. In an example embodiment, the at least one of the reference point, axis, or plane is a center point, midline axis, or midline plane of the vehicle, respectively. In an example embodiment, the at least one memory and the computer program code are further configured to, with the processor, cause the apparatus to at least obtain an indication of further user input indicating a changed position of the mobile device within the vehicle; determine a changed offset of the mobile device from at least one of the reference point, axis, or plane of the vehicle based on the changed position of the mobile device within the vehicle; determine a changed location of the vehicle with respect to the coordinate system based at least in part on the location of the mobile device and the determined changed offset; and provide the changed location of the vehicle with respect to the coordinate system such that the user interface of the mobile device displays the symbol indicating the changed location of the vehicle with respect to the coordinate system. In an example embodiment, the indication of the user input identifies a region within the vehicle that the mobile device is positioned at within the vehicle and the position of the mobile device within the vehicle is determined based at least in part on the identified region. In an example embodiment, the position of the mobile device within the vehicle is determined to be a center point of the identified region.

In still another aspect of the present disclosure, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus (e.g., a mobile device and/or network device), to cause the apparatus to obtain an indication of user input identifying a position of a mobile device within a vehicle; obtain a location of the mobile device with respect to a coordinate system that is independent of the vehicle; and determine a location of the vehicle with respect to the coordinate system based at least in part on the location of the mobile device and the identified position of the mobile device within the vehicle.

In an example embodiment, the user input is received by the mobile device via user interaction with at least one input device of the user interface. In an example embodiment, the at least one input device being one of (a) a touch display or (b) a microphone. In an example embodiment, the input of user input is accessed from a user profile stored in a memory of at least one of (a) the mobile device or (b) accessible to the processor. In an example embodiment, the processor is a component of one of (a) the mobile device or (b) a network device. In an example embodiment, the location of the mobile device with respect to the coordinate system is determined by a global navigation satellite system (GNSS) sensor of the mobile device. In an example embodiment, the location of the mobile device with respect to the coordinate system is known to sub-meter accuracy. In an example embodiment, the location of the vehicle with respect to the coordinate system is used to perform at least one positioning-related or navigation-related function. In an example embodiment, the computer-readable program code portions comprise executable portions configured, when executed by the processor of the apparatus, to cause the apparatus to perform at least one of (a) causing display of a symbol via an interactive user interface of a device indicating the location of the vehicle with respect to the coordinate system; or (b) performing one or more positioning-related or navigation-related functions based on the location of the vehicle with respect to the coordinate system. In an example embodiment, the computer-readable program code portions comprise executable portions configured, when executed by the processor of the apparatus, to cause the apparatus to determine an offset of the mobile device from at least one of a reference point, axis, or plane of the vehicle based on the position of the mobile device within the vehicle, wherein determined offset is used to determine the location of the vehicle with respect to the coordinate system. In an example embodiment, the at least one of the reference point, axis, or plane is a center point, midline axis, or midline plane of the vehicle, respectively. In an example embodiment, the computer-readable program code portions comprise executable portions configured, when executed by the processor of the apparatus, to cause the apparatus to obtain an indication of further user input indicating a changed position of the mobile device within the vehicle; determine a changed offset of the mobile device from at least one of the reference point, axis, or plane of the vehicle based on the changed position of the mobile device within the vehicle; determine a changed location of the vehicle with respect to the coordinate system based at least in part on the location of the mobile device and the determined changed offset; and provide the changed location of the vehicle with respect to the coordinate system such that the user interface of the mobile device displays the symbol indicating the changed location of the vehicle with respect to the coordinate system. In an example embodiment, the indication of the user input identifies a region within the vehicle that the mobile device is positioned at within the vehicle and the position of the mobile device within the vehicle is determined based at least in part on the identified region. In an example embodiment, the position of the mobile device within the vehicle is determined to be a center point of the identified region.

According to yet another aspect, an apparatus is provided. In an example embodiment, the apparatus comprises means for obtaining an indication of user input identifying a position of a mobile device within a vehicle. The apparatus comprises means for obtaining a location of the mobile device with respect to a coordinate system that is independent of the vehicle. The apparatus comprises means for determining a location of the vehicle with respect to the coordinate system based at least in part on the location of the mobile device and the identified position of the mobile device within the vehicle.

According to an aspect of the present disclosure, a method for determining a location of a vehicle with respect to a coordinate system that is independent of the vehicle is provided. In an example embodiment, the method comprises causing, by one or more processors, a mobile device to display an interactive user interface (IUI). The IUI comprising one or more interface features. The one or more interface features configured to enable selection of a vehicle portion corresponding to a position of the mobile device within a vehicle. The method further comprises receiving, by the one or more processors and via interaction with at least one of the one or more interface features, selection of a first vehicle portion. The selection of the first vehicle portion indicates that the mobile device is positioned within the first vehicle portion within the vehicle. The method further comprises determining, by the one or more processors, a location of the vehicle with respect to a coordinate system that is independent of the vehicle based at least in part on the first vehicle portion.

In an example embodiment, the method further comprises at least one of (a) causing display of a symbol via the IUI indicating the location of the vehicle with respect to the coordinate system; or (b) performing one or more positioning-related or navigation-related functions based on the location of the vehicle with respect to the coordinate system. In an example embodiment, the one or more interface features comprise a vehicle portion indicator configured to be slid along a slide bar, each position along the slide bar corresponding to a vehicle portion. In an example embodiment, each of the one or more interface features each correspond to a vehicle portion that is a region corresponding to a portion of an interior of the vehicle. In an example embodiment, a granularity of the vehicle portions is determined based on user selection of a number of vehicle portions. In an example embodiment, the IUI comprises a representation of the vehicle and a granularity of the vehicle portions is determined based at least in part on a scale of the representation of the vehicle. In an example embodiment, each pixel of the representation of the vehicle is an interface features of the one or more interface features and corresponds to a respective vehicle portion.

According to another aspect of the present disclosure, an apparatus (e.g., mobile device and/or network device) is provided. In an example embodiment, the apparatus comprises at least one processor and at least one memory storing computer program code. The at least one memory and the computer program code are configured to, with the processor, cause the apparatus to at least cause a mobile device to display an interactive user interface (IUI). The IUI comprising one or more interface features. The one or more interface features configured to enable selection of a vehicle portion corresponding to a position of the mobile device within a vehicle. The at least one memory and the computer program code are further configured to, with the processor, cause the apparatus to at least receive, via interaction with at least one of the one or more interface features, selection of a first vehicle portion. The selection of the first vehicle portion indicates that the mobile device is positioned within the first vehicle portion within the vehicle. The at least one memory and the computer program code are configured to, with the processor, cause the apparatus to at least determine a location of the vehicle with respect to a coordinate system that is independent of the vehicle based at least in part on the first vehicle portion.

In an example embodiment, the at least one memory and the computer program code are further configured to, with the processor, cause the apparatus to perform at least one of (a) cause display of a symbol via the IUI indicating the location of the vehicle with respect to the coordinate system; or (b) perform one or more positioning-related or navigation-related functions based on the location of the vehicle with respect to the coordinate system. In an example embodiment, the one or more interface features comprise a vehicle portion indicator configured to be slid along a slide bar, each position along the slide bar corresponding to a vehicle portion. In an example embodiment, each of the one or more interface features each correspond to a vehicle portion that is a region corresponding to a portion of an interior of the vehicle. In an example embodiment, a granularity of the vehicle portions is determined based on user selection of a number of vehicle portions. In an example embodiment, the IUI comprises a representation of the vehicle and a granularity of the vehicle portions is determined based at least in part on a scale of the representation of the vehicle. In an example embodiment, each pixel of the representation of the vehicle is an interface features of the one or more interface features and corresponds to a respective vehicle portion.

In still another aspect of the present disclosure, a computer program product is provided. In an example embodiment, the computer program product comprises at least one non-transitory computer-readable storage medium having computer-readable program code portions stored therein. The computer-readable program code portions comprise executable portions configured, when executed by a processor of an apparatus (e.g., a mobile device and/or network device), to cause the apparatus to cause a mobile device to display an interactive user interface (IUI). The IUI comprising one or more interface features. The one or more interface features configured to enable selection of a vehicle portion corresponding to a position of the mobile device within a vehicle. The computer-readable program code portions comprise executable portions configured, when executed by the processor of the apparatus, to cause the apparatus to receive, via interaction with at least one of the one or more interface features, selection of a first vehicle portion. The selection of the first vehicle portion indicates that the mobile device is positioned within the first vehicle portion within the vehicle. The computer-readable program code portions comprise executable portions configured, when executed by the processor of the apparatus, to cause the apparatus to determine a location of the vehicle with respect to a coordinate system that is independent of the vehicle based at least in part on the first vehicle portion.

In an example embodiment, the computer-readable program code portions comprise executable portions configured, when executed by the processor of the apparatus, to cause the apparatus to perform at least one of (a) cause display of a symbol via the IUI indicating the location of the vehicle with respect to the coordinate system; or (b) perform one or more positioning-related or navigation-related functions based on the location of the vehicle with respect to the coordinate system. In an example embodiment, the one or more interface features comprise a vehicle portion indicator configured to be slid along a slide bar, each position along the slide bar corresponding to a vehicle portion. In an example embodiment, each of the one or more interface features each correspond to a vehicle portion that is a region corresponding to a portion of an interior of the vehicle. In an example embodiment, a granularity of the vehicle portions is determined based on user selection of a number of vehicle portions. In an example embodiment, the IUI comprises a representation of the vehicle and a granularity of the vehicle portions is determined based at least in part on a scale of the representation of the vehicle. In an example embodiment, each pixel of the representation of the vehicle is an interface features of the one or more interface features and corresponds to a respective vehicle portion.

According to yet another aspect, an apparatus (e.g., mobile device and/or network device) is provided. The mobile device comprises means for causing a mobile device to display an interactive user interface (IUI). The IUI comprising one or more interface features. The one or more interface features configured to enable selection of a vehicle portion corresponding to a position of the mobile device within a vehicle. The apparatus comprises means for receiving, via interaction with at least one of the one or more interface features, selection of a first vehicle portion. The selection of the first vehicle portion indicates that the mobile device is positioned within the first vehicle portion within the vehicle. The apparatus comprises means for determining a location of the vehicle with respect to a coordinate system that is independent of the vehicle based at least in part on the first vehicle portion.

BRIEF DESCRIPTION OF THE DRAWINGS

Figure 1:
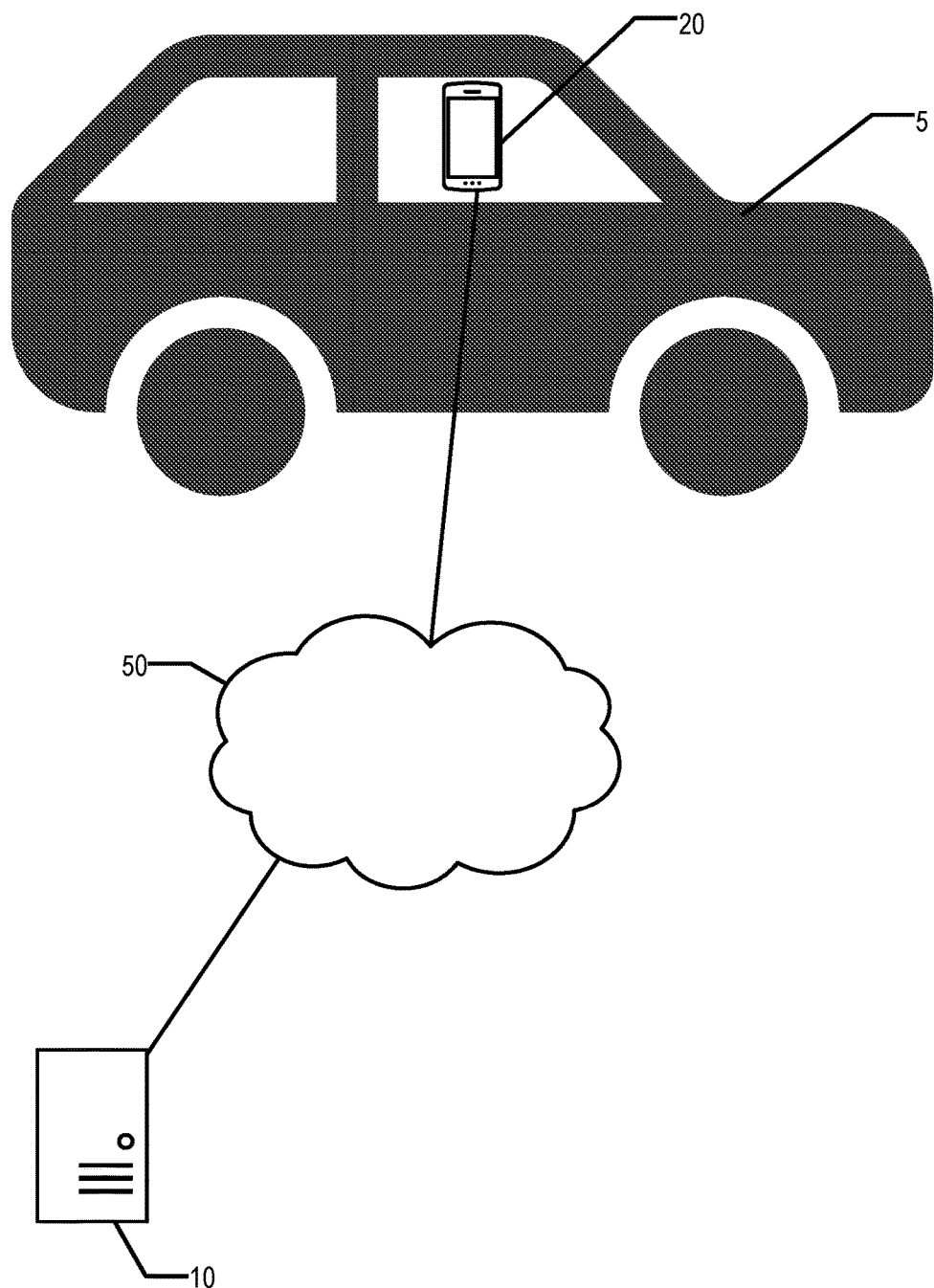
Figure 2:
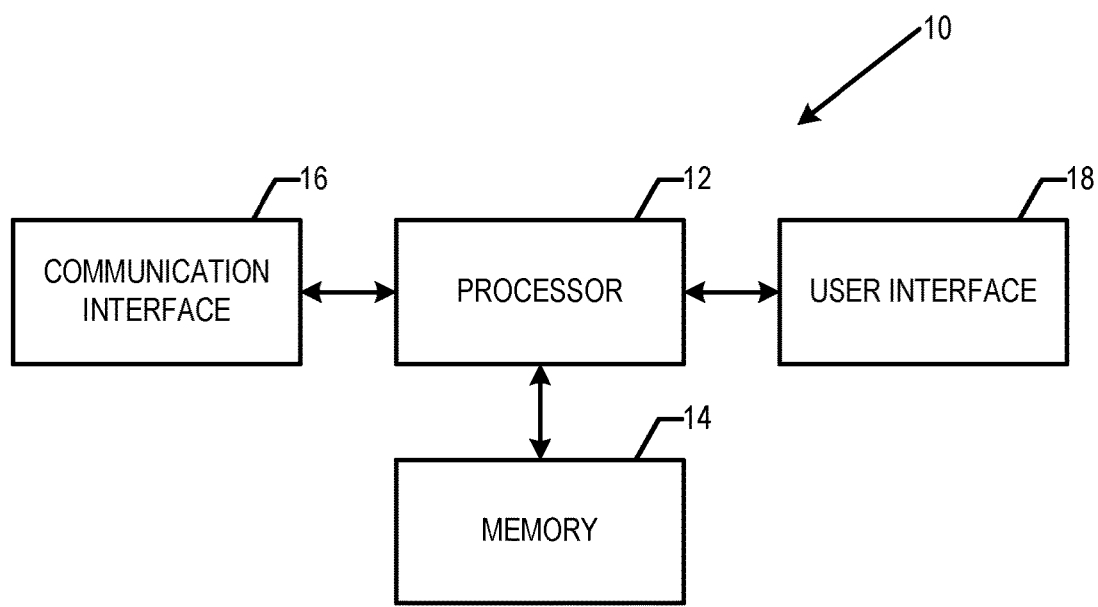
Figure 3:
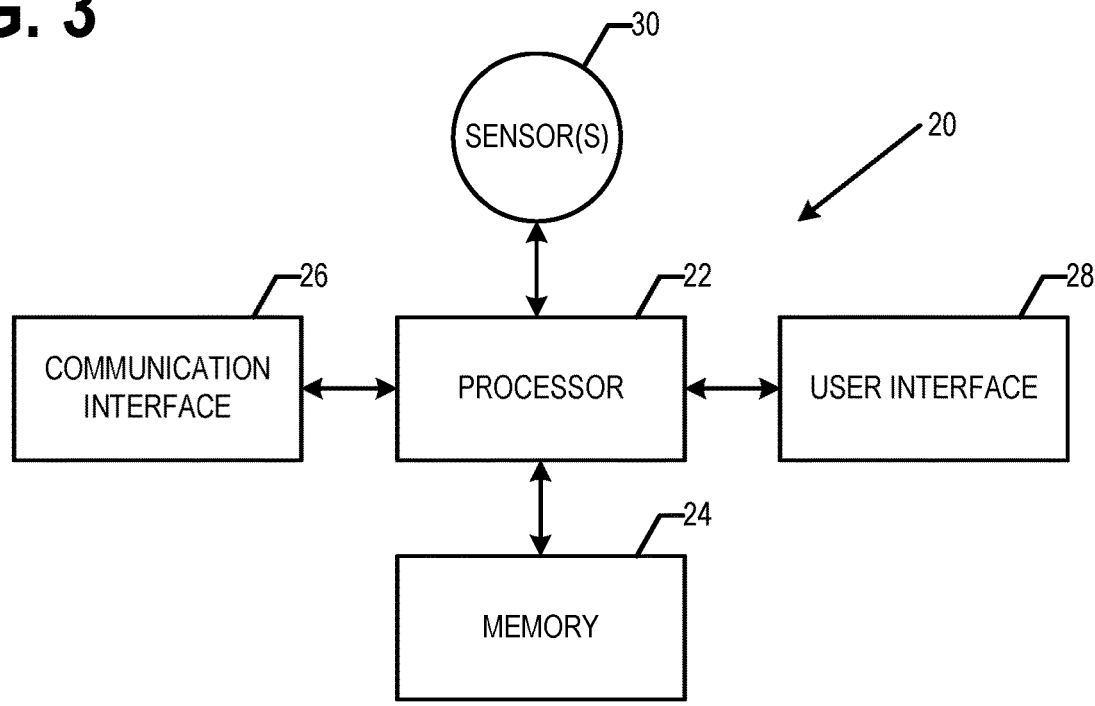
Figure 4:
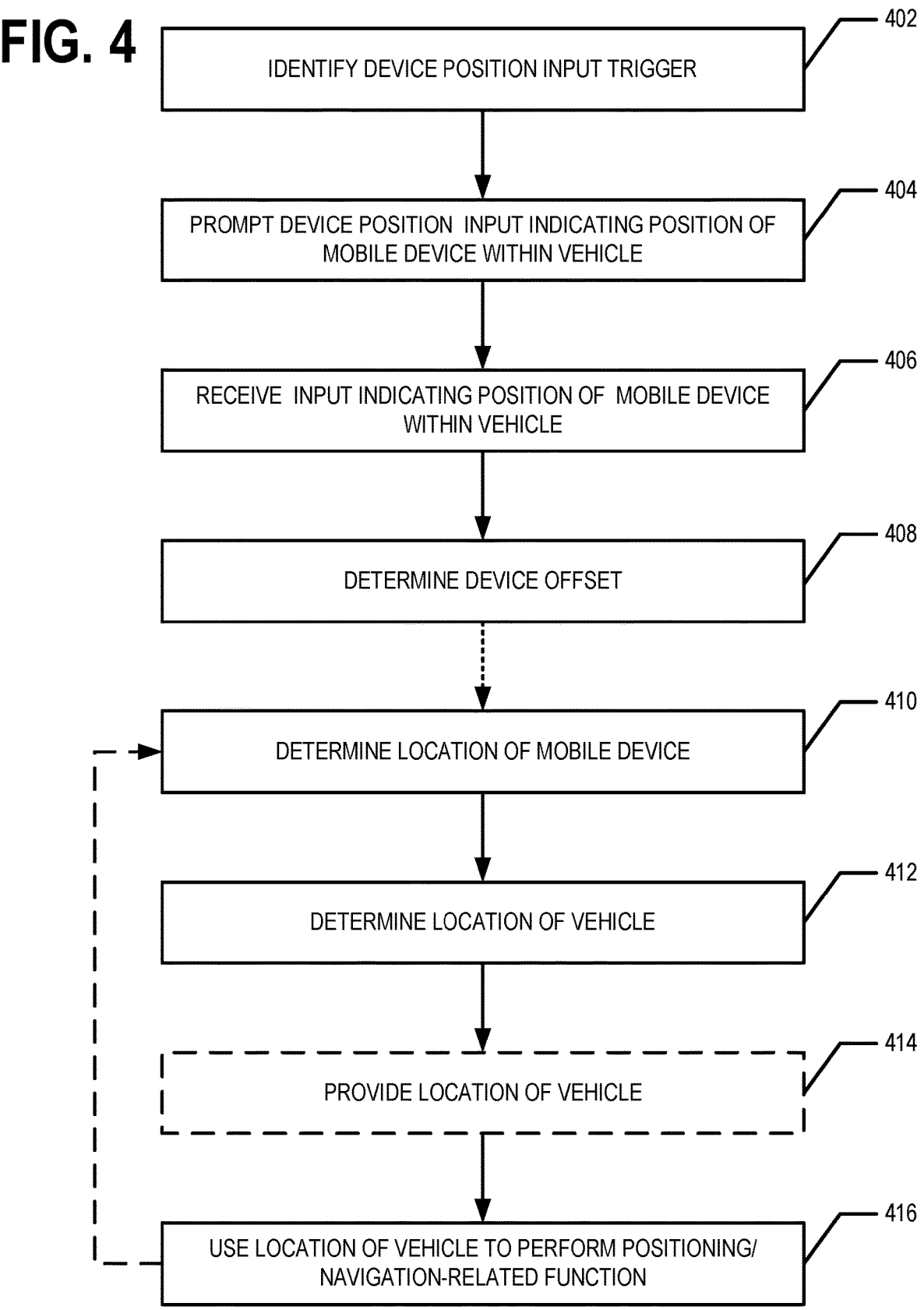
Figure 5:
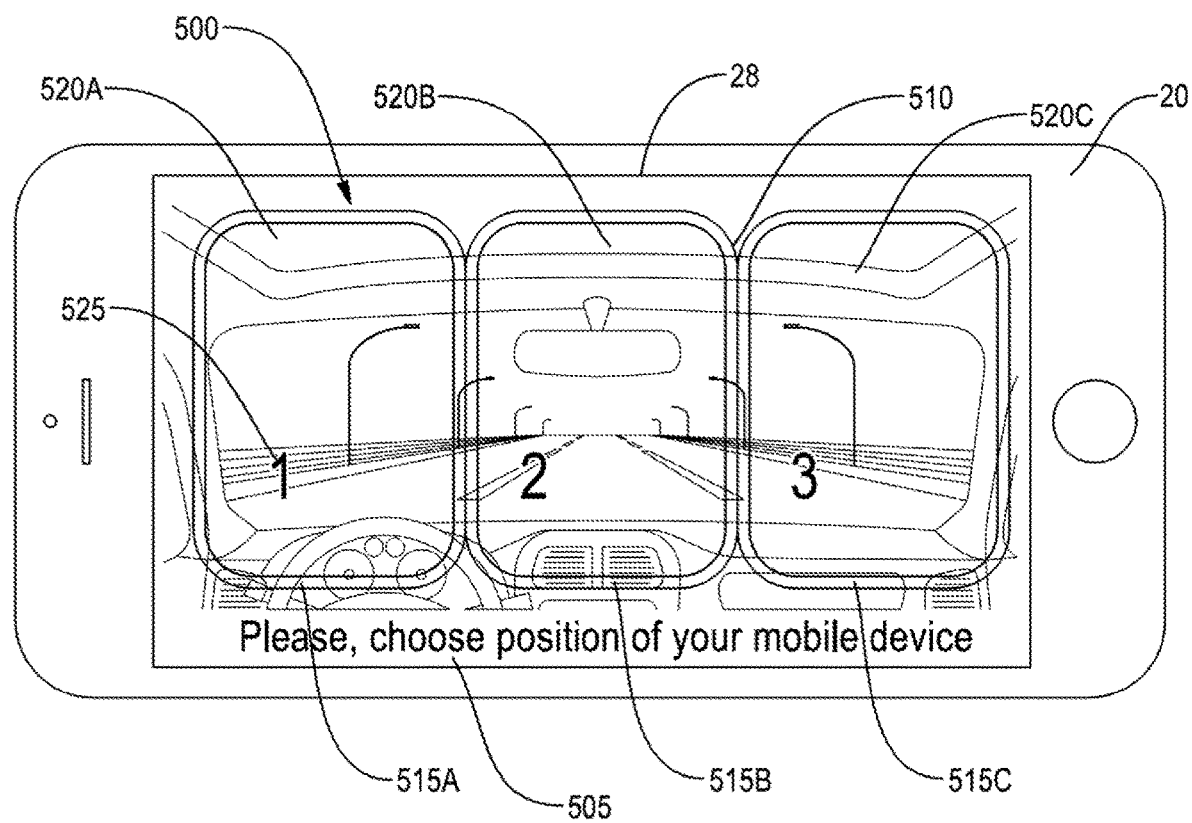
Figure 6:
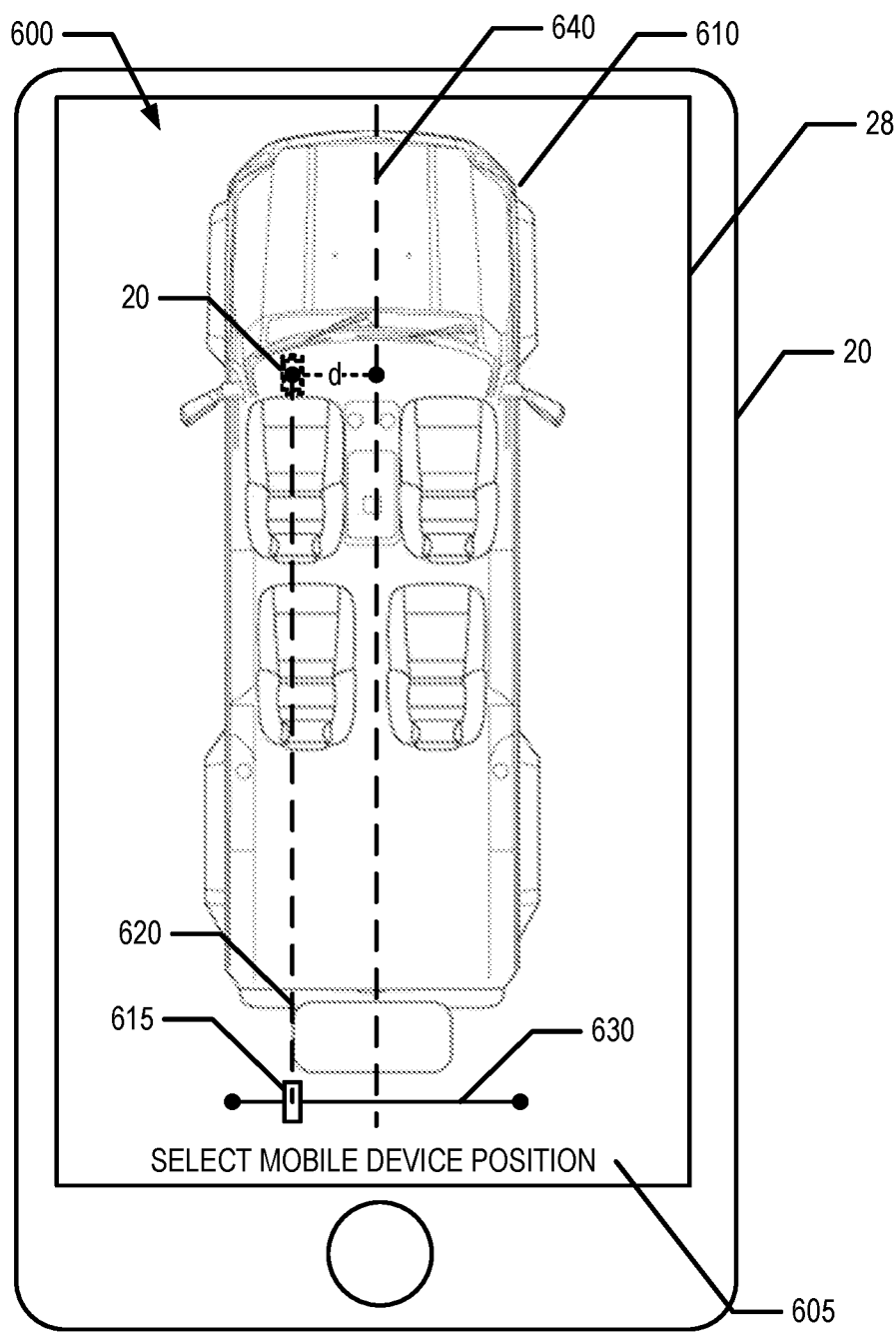
Figure 7:
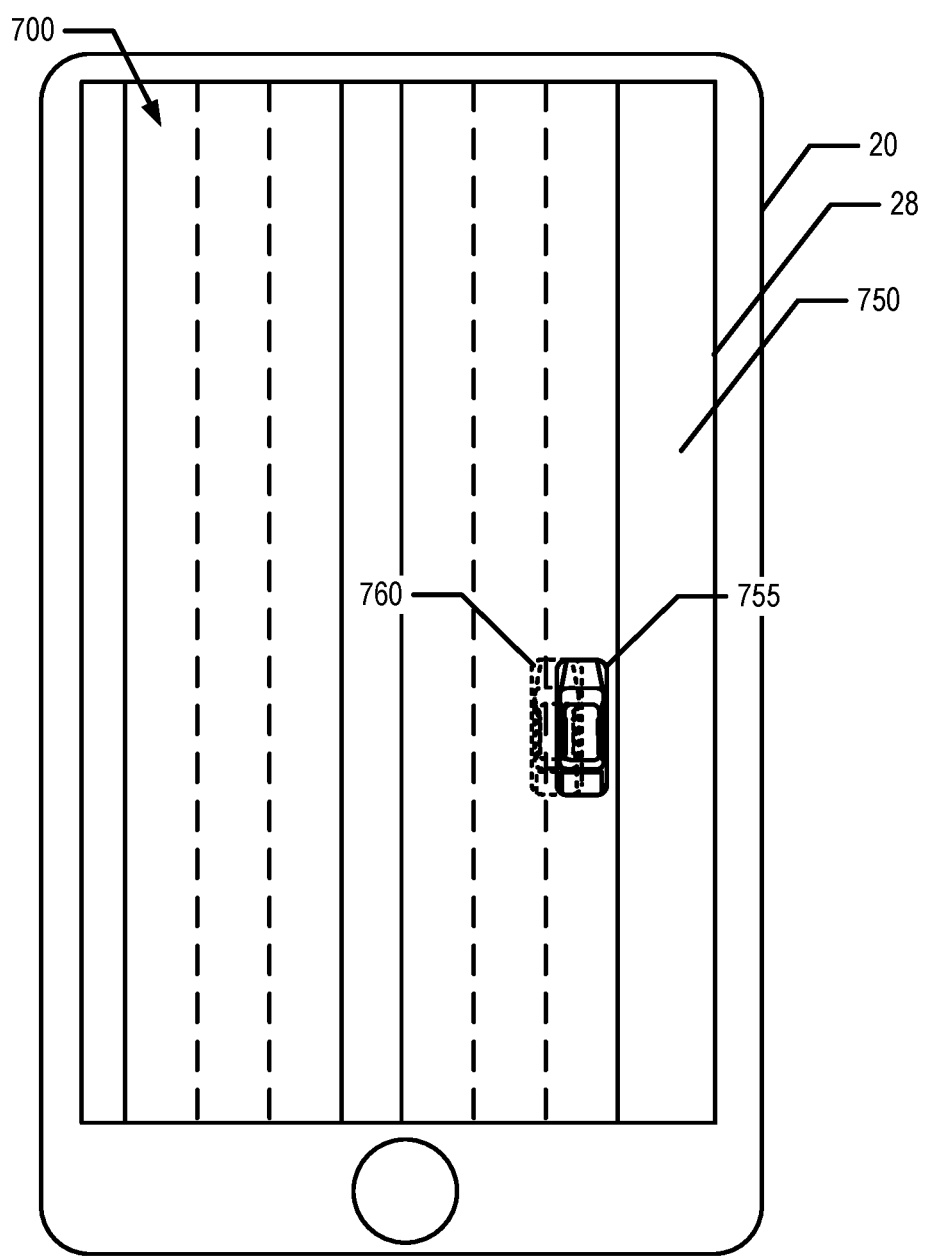

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2 is a block diagram of a network device that may be specifically configured in accordance with an example embodiment;

FIG. 3 is a block diagram of a mobile device that may be specifically configured in accordance with an example embodiment;

FIG. 4 is a flowchart illustrating operations performed, such as by the network device of FIG. 2 or the mobile device of FIG. 3, in accordance with an example embodiment;

FIGS. 5 and 6 provide example screenshots of two different embodiments of a position selection view of an interactive user interface (IUI), in accordance with various embodiments; and FIG. 7 provides an example screen shot of a location display view of an IUI, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values and/or tolerances that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus and computer program products are provided in accordance with an example embodiment in order accurately determine the location of a vehicle with respect to a coordinate system that is independent of the vehicle based on a location of a mobile device with respect to the coordinate system. For example, in an example embodiment, the location of the vehicle may be determined to sub-meter accuracy based on a GNSS-determined location of a mobile device that is onboard the vehicle.

For example, a device position input trigger may be identified. Responsive to the device position input trigger being identified, a position of the mobile device within the vehicle may be requested. For example, a user interface may provide instructions for providing input indicating a position of the mobile device within the vehicle. An indication of input indicating the position of the mobile device within the vehicle may be received. For example, the indication of the input indicating the position of the mobile device within the vehicle may comprise information identifying a vehicle portion corresponding to the position of the mobile device within the vehicle. In various embodiments, the vehicle portion may be a particular position within the vehicle, a region within the vehicle, and/or the like. In an example embodiment, an offset of the mobile device within the vehicle with respect to a reference point, axis, or plane of the vehicle may be determined. The location of the mobile device with respect to the coordinate system that is independent of the vehicle may then be determined using GNSS or other location-determining means. The position of the mobile device within the vehicle and the location of the mobile device with respect to the coordinate system that is independent of the vehicle may then be used to determine the location of the vehicle with respect to the coordinate system that is independent of the vehicle. The location of the vehicle with respect to the coordinate system that is independent of the vehicle may then be used to perform one or more positioning and/or navigation-related functions corresponding to the vehicle and/or travel of the vehicle. In various embodiments, the location of the vehicle may be performed by the mobile device or by a network device in communication with the mobile device via one or more wired and/or wireless networks, for example. In various embodiments, the positioning and/or navigation-related functions performed based on the determined location of the vehicle may be performed by the mobile device and/or the network device.

FIG. 1 provides an illustration of an example system that can be used in conjunction with various embodiments of the present invention. As shown in FIG. 1, the system may include one or more network devices 10, one or more mobile devices 20, one or more networks 50, and/or the like. In various embodiments, a mobile device 20 may be a user device, probe device, and/or the like. In various embodiments, the mobile device 20 may be an in vehicle navigation system, vehicle control system, a mobile computing device, a mobile data gathering platform, IoT device, and/or the like.

In various embodiments, the mobile device 20 may be a smartphone, tablet, personal digital assistant (PDA), personal computer, desktop computer, laptop, mobile computing device, IoT device, and/or the like. In general, an IoT device is a mechanical and/or digital device configured to communicate with one or more computing devices and/or other IoT devices via one or more wired and/or wireless networks 50. For example, the mobile device 20 may be a mobile computing entity configured to perform one or more positioning and/or navigation-related functions corresponding to a vehicle 5 and/or travel of the vehicle 5 when the mobile device 20 is onboard and/or within the vehicle 5. In an example embodiment, the network device 10 is a server, group of servers, distributed computing system, and/or other computing system. For example, the network device 10 may be in communication with one or more mobile devices 20 and/or the like via one or more wired or wireless networks 50.

In an example embodiment, a network device 10 may comprise components similar to those shown in the example network device 10 diagrammed in FIG. 2. In an example embodiment, the network device 10 is configured to determine a location of a vehicle based on information corresponding to the location of a mobile device 20 and a position of the mobile device 20 within the vehicle, perform one or more positioning and/or navigation-related functions based on a location of the vehicle, and/or the like. For example, as shown in FIG. 2, the network device 10 may comprise a processor 12, memory 14, a communications interface 16, a user interface 18, and/or other components configured to perform various operations, procedures, functions or the like described herein. In various embodiments, the network device 10 stores a geographical database and/or digital map (e.g., in memory 14). In at least some example embodiments, the memory 14 is non-transitory.

In an example embodiment, a mobile device 20 is a mobile computing entity, IoT device, and/or the like. In an example embodiment, the mobile device 20 may be configured to provide and/or display an IUI, receive input indicating a position of the mobile device within a vehicle, determine the location of the mobile device with respect to a coordinate system that is independent of the vehicle, determine the location of the vehicle based on the location of the mobile device with respect to the coordinate system and the position of the mobile device within the vehicle, perform one or more positioning and/or navigation-related functions based on the location of the vehicle with respect to the coordinate system. In an example embodiment, as shown in FIG. 3, the mobile device 20 may comprise a processor 22, memory 24, a communications interface 26, a user interface 28, one or more sensors 30 and/or other components configured to perform various operations, procedures, functions or the like described herein. In various embodiments, the mobile device 20 stores at least a portion of one or more geographic databases, digital maps, and/or the like and/or computer executable instructions for performing one or more positioning and/or navigation-related functions in memory 24. In at least some example embodiments, the memory 24 is non-transitory.

In various embodiments, the sensors 30 comprise one or more location sensors such as a GNSS sensor, inertial measurement unit (IMU) sensors (e.g., accelerometers, gyroscopes, magnetometers, and/or the like), altimeters, and/or the like. For example, the location sensors may be configured to determine and/or enable determining a location of the mobile device with respect to a coordinate system that is independent of a vehicle, the mobile device, and/or the like. For example, the coordinate system may be World Geodetic System WGS-84 reference frame-based coordinate system, Parametry Zemli 1990 reference frame-based coordinate system, Galileo Terrestrial Reference Frame (GTRF) reference frame-based coordinate system, and/or other coordinate system that is independent of the vehicle. In various embodiments, the sensors 30 comprise one or more image sensors configured to capture visual samples, such as digital camera(s), 3D cameras, 360° cameras, and/or image sensors. In various embodiments, the one or more sensors 30 may comprise one or more interfaces, such as radio interfaces, configured to observe and/or receive signals generated and/or transmitted by one or more access points. In various embodiments, the sensors 30 may comprise various other sensors such as two dimensional (2D) and/or three dimensional (3D) light detection and ranging (LiDAR)(s), long, medium, and/or short range radio detection and ranging (RADAR), ultrasonic sensors, electromagnetic sensors, (near-) infrared (IR) cameras.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In an example embodiment, a network 50 comprises the automotive cloud, digital transportation infrastructure (DTI), radio data system (RDS)/high definition (HD) radio or other digital radio system, and/or the like. For example, a mobile device 20 may be in communication with a network device 10 via the network 50. For example, a mobile device 20 may communicate with the network device 10 via a network, such as the Cloud. For example, the Cloud may be a computer network that provides shared computer processing resources and data to computers and other devices connected thereto. For example, the mobile device 20 may be configured to provide requests for performance of one or more positioning and/or navigation-related functions via the network 50. For example, a mobile device 20 may be configured to receive a location of the vehicle with respect to a coordinate system that is independent of the vehicle and/or a result of performing one or more positioning and/or navigation-related functions via the network 50. For example, the network device 10 may configured to receive requests for performing one or more positioning and/or navigation-related functions and provide a results of performing the one or more positioning and/or navigation-related functions via the network 50.

Certain example embodiments of the network device 10 and/or mobile device 20 are described in more detail below with respect to FIGS. 2 and 3.

II. Example Operation(s)

Satellite-based (e.g., GNSS) positioning is a common device positioning tool. Historically, however, GNSS-determined locations have an accuracy of at best approximately five meters. Thus, conventionally, if a mobile device is located within a vehicle the location of the vehicle is assumed to be the location of the mobile device. For example, the mobile device 20 may be assumed to be aligned with a reference point, reference axis, and/or reference plane of the vehicle 5. However, the mobile device 20 may be onboard and/or within the vehicle 5 and be a meter or more from a reference point, axis, or plane of the vehicle 5. For example, a reference point of a vehicle 5 may be the central point of the vehicle. In another example, a references axis of the vehicle 5 may be a central axis from the front of the vehicle to the back of the vehicle, such as example reference axis 640 shown in FIG. 6 which corresponds to a midline of the vehicle 5. In another example, a reference plane of the vehicle 5 may be a vertical plane or horizontal plane having the references axis of the vehicle 5 therein. For example, the reference axis 640 may be within a vertical plane that extends from the bottom of the vehicle 5 to the roof of the vehicle 5. Therefore, assuming a mobile device 20 onboard a vehicle 5 is aligned with a reference point, reference axis, and/or reference plane of the vehicle 5 may introduce an uncertainty of approximately a meter into the determined location of the vehicle 5. As historically the accuracy of GNSS-determined locations have had an accuracy of at best approximately 5 meters, the uncertainty introduced into the location of a vehicle 5 by assuming that the location of a mobile device onboard the vehicle 5 that determined the GNSS-determined location is the location of the vehicle is relatively small. As such, the uncertainty introduced into the location of a vehicle 5 by assuming that the location of a mobile device onboard the vehicle 5 that determined the GNSS-determined location is the location of the vehicle has not been previously addressed.

Embodiments of the present invention address the generally previously unidentified and unaddressed technical problem of the uncertainty in the location of a vehicle 5 determined based on the location of a mobile device 20 onboard and/or within the vehicle 5. In particular, embodiments of the present invention provide technical solutions for mitigating the uncertainty in the location of a vehicle 5 determined based on the location of a mobile device 20 onboard and/or within the vehicle 5. Thus, embodiments of the present invention provide for more accurate performance of positioning and/or navigation-related functions that make use of the location of the vehicle 5. For example, embodiments of the present invention may enable lane level localization of a vehicle 5, lane level display of a location of the vehicle 5, lane level routing of a vehicle 5, among other more accurately performed positioning and/or navigation-related functions. As such, various embodiments address technical problems that specifically arise in the technical field of performing positioning and/or navigation-related functions and therefore are particularly rooted in corresponding technologies.

FIG. 4 provides a flowchart illustrating various processes, procedures, operations, and/or the like performed, for example, by a mobile device 20 or a network device 10, in accordance with an example embodiment. Starting at block 402, a device position input trigger is identified. For example, the mobile device 20 and/or network device 10 may identify a device position input trigger. For example, the mobile device 20 may comprise means, such as processor 22, memory 24, communications interface 26, user interface 28, sensors 30, and/or the like, for identifying a device position input trigger. For example, a network device 10 may comprise means, such as processor 12, memory 14, communications interface 16, and/or the like for identifying a device position input trigger. For example, a mobile device 20 may be operating an application that, possibly responsive to user input received via user interface 28, identifies a device position input trigger. For example, the user may interact with user interface 28 to request a route and/or provide input indicating the beginning of traversing a route (which may be known or not known by the mobile device 20) which may cause a device position input trigger to be identified. For example, if the mobile device 20 or network device 10 (e.g., based at least in part on measurements captured by one or more sensors 30) determines that the mobile device 20 is moving at a speed that is unlikely to be caused by a user walking or running, which may cause a device position input trigger to be identified. In another example, the mobile device 20 or network device 10 (e.g., based on measurements captured by one or more sensors 30) may determine that the mobile device 20 is changing and/or has changed positions within the vehicle 5, which may cause a device position input trigger to be identified. In another example, the user may interact with the user interface 28 to cause the mobile device 20 to initiate execution of an application. Initiation of the execution of the application may cause a device position input trigger to be identified. In yet another example, the user may interact with the user interface 28 (e.g., via input circuitry and/or one or more input devices such as a touch screen/display, microphone, and/or the like) to provide input indicating the user would like to or is providing information regarding position of the mobile device 20 within the vehicle, which may cause a device position input trigger to be identified.

At block 404, a device position input may be prompted. For example, the mobile device 20 may provide a prompt and/or request for a user to provide device position input. For example, the mobile device 20 may comprise means, such as processor 22, memory 24, communications interface 26, user interface 28, and/or the like, providing a prompt and/or request for a user to provide device position input. For example, the network device 10 may cause the mobile device 20 to provide a prompt and/or request for a user to provide device position input. For example, the network device 10 may comprise means, such as processor 12, memory 14, communications interface 16, and/or the like, for causing the mobile device 20 to provide a prompt and/or request for a user to provide device position input. In various embodiments, device position input is input (e.g., received via user interface 28) indicating the position of the mobile device 20 within the vehicle 5. For example, the device position input may provide an indication of a vehicle portion within the vehicle 5 within and/or at which the mobile device 20 is positioned.

For example, the mobile device 20 may (and/or be caused to) provide an audible request (via an output device such as a speaker of the user interface 28) for a user to provide device position input. In another example, the mobile device 20 may (and/or be caused to) provide a position selection view of an interactive user interface (IUI). For example, one or more processors 22 of the mobile device 20 may execute an application (e.g., executable instructions stored in memory 24) that configures the mobile device 20 to perform one or more positioning and/or navigation-related functions. The application may be configured to provide the IUI for providing (e.g., displaying) results of performing one or more positioning and/or navigation-related functions for user review. For example, the application may be configured to provide an IUI that displays the location of the vehicle 5 overlaid on a portion of a digital map. For example, the application may be configured to provide an IUI that provides route guidance for an operator of the vehicle 5. The application may be further configured to provide a position selection view of the IUI, two examples of which are shown in FIGS. 5 and 6.

FIG. 5 illustrates an example position selection view 500 of the IUI provided via user interface 28 of the mobile device 20. For example, the position selection view 500 comprises a graphical representation 510 of at least a part of the vehicle 5. For example, the graphical representation 510 of the at least a part of the vehicle 5 may be a diagram, stored picture (e.g., stored in memory 24), live picture (e.g., captured in real-time and/or near real-time with respect to display of the position selection view 500 by a sensor 30), and/or other graphical representation of the dashboard and/or or front portion of the cabin of the vehicle 5. In an example embodiment, the graphical representation 510 of the at least a part of the vehicle 5 may be specific to the vehicle 5 (e.g., the make, model, and/or year of the vehicle 5). In an example embodiment, the graphical representation 510 of the at least a part of the vehicle 5 may be specific to a type of the vehicle 5 (e.g., sedan, SUV, truck, etc.; brand of the vehicle 5; and/or the like). In an example embodiment, the graphical representation 510 of the least a portion of the vehicle is a generic illustration of the at least a part of a vehicle.

In various embodiments, the position selection view 500 of the IUI may further comprise instructions and/or prompt 505 providing instructions and/or prompting a user to provide device position input. In various embodiments, the position selection view 500 of the IUI may further comprise vehicle portion indicators 515 (e.g., 515A, 515B, 515C) indicating different selectable vehicle portions 520 (e.g., 520A, 520B, 520C). For example, in the embodiment illustrated in FIG. 5, the vehicle portions 520 are regions within the vehicle 5 and the vehicle portion indicators 515 illustrate what portions of the vehicle 5 correspond to each region based on the graphical representation 510 of the at least a part of the vehicle 5. In an example embodiment, each vehicle portion 520 may be associated with a vehicle portion identifier 525. In an example embodiment, the position selection view 500 of the IUI may be configured to enable a user to provide device position input by selecting a vehicle portion 520, for example, by touching a portion of a touch screen/display or clicking a portion of a display delimited by the corresponding vehicle portion indicator 515. The position selection view 500 of the IUI may be configured to enable a user to audibly provide device position input by speaking the vehicle portion identifier 525 corresponding to the vehicle portion 520 where the mobile device 20 is positioned within the vehicle 5.

FIG. 6 provides another example position selection view 600 of the IUI provided via user interface 28 of the mobile device 20. For example, the position selection view 600 comprises a graphical representation 610 of at least a part of the vehicle 5. For example, the graphical representation 610 of the at least a part of the vehicle 5 may be a diagram, stored picture (e.g., stored in memory 24), live picture (e.g., captured in real-time and/or near real-time with respect to display of the position selection view 600 by a sensor 30), and/or other graphical representation of a top and/or plan view of a cabin of the vehicle 5. In an example embodiment, the graphical representation 610 of the at least a part of the vehicle 5 may be specific to the vehicle 5 (e.g., the make, model, and/or year of the vehicle 5). In an example embodiment, the graphical representation 610 of the at least a part of the vehicle 5 may be specific to a type of the vehicle 5 (e.g., sedan, SUV, truck, etc.; brand of the vehicle 5; and/or the like). In an example embodiment, the graphical representation 610 of the least a portion of the vehicle 5 is a generic illustration of the at least a part of a vehicle.

In various embodiments, the position selection view 600 of the IUI may further comprise instructions and/or prompt 605 providing instructions and/or prompting a user to provide device position input. The position selection view 600 may further comprise a slide bar 630 and a vehicle portion indicator 615 configured to be slid along the slide bar 630 via user interaction with the IUI. For example, the user interface 28 may receive input regarding interaction with the IUI that causes the vehicle portion indicator 615 to be moved along the slide bar 630 to a position along the slide bar 630 that corresponds to the vehicle portion 620 within and/or at which the mobile device 20 is located within the vehicle 5. In an example embodiment, the position selection view may or may not include a slide bar 630 and the user may select a vehicle portion where the mobile device 20 is positioned within the vehicle by touching a portion of the touch screen/display and/or clicking on a portion of a display corresponding to the vehicle portion based on the graphical representation of the at least a part of the vehicle 5.

In the embodiment illustrated by FIG. 6, the granularity of the vehicle portions 620 that may be selected as being where the mobile device 20 is positioned within the vehicle 5 is defined by and/or corresponds to the scale of the graphical representation 610 of the at least a part of the vehicle 5 with respect to the actual size of the vehicle 5. For example, in various embodiments, each pixel or column of pixels corresponding to the graphical representation 610 of the at least a part of the vehicle 5 corresponds to a vehicle portion 620 within and/or at which the mobile device 20 may be positioned within the vehicle 5.

In the embodiment illustrated in FIG. 5, the granularity of the vehicle portions 520 that may be selected as being where the mobile device is positioned within the vehicle 5 is defined by a number of regions displayed and/or defined. In various embodiments, the number of regions displayed and/or defined is a set number (e.g., two, three, five, and/or the like). In various embodiments, the number of regions displayed and/or defined is determined based on user input (e.g., a user may select or input the number of regions to be displayed and/or defined via interaction with the IUI) or based on information stored in a user profile (e.g., stored in memory 14 and/or memory 24) corresponding to a user of the mobile device 20 and configured for storing user information, preferences, and/or the like.

For example, in various embodiments, providing the position selection view of the IUI may comprise determining a granularity of vehicle portions that may be selected from and defining the vehicle portions. In an example embodiment, providing the position selection view of the IUI may further comprise defining one or more interface features each corresponding to at least one vehicle portion. For example, in an example embodiment, the one or more interface features are the vehicle portion indicators 515. In another example, the one or more interface features comprise the vehicle portion indicator 615 disposed on slide bar 630. In another example, the one or more interface features may be individual pixels and/or columns of pixels of the graphical representation of the at least a part of the vehicle 5. In an example embodiment, providing the position selection view of the IUI may further comprise identifying a geographical representation corresponding to the vehicle 5 and/or associating each defined vehicle portion with a particular interface feature and/or a position/status of an interface feature. In an example embodiment, providing the position selection view of the IUI may further comprise rendering the graphical representation identified as corresponding to the vehicle 5, rendering the interface features, and enabling selection of and/or interaction with the interface features such that selection of and/or interaction with an interface feature enables input identifying a vehicle portion to be received (e.g., via the user interface 28).

Returning to FIG. 4, at block 406, device position input and/or an indication of input (e.g., user input) identifying a position of the mobile device within the vehicle is received and/or obtained. For example, the mobile device 20 may receive and/or obtain device position input and/or an indication of input (e.g., user input) identifying a position of the mobile device within the vehicle. For example, the mobile device 20 may comprise means, such as processor 22, memory 24, communications interface 26, user interface 28, and/or the like, for receiving and/or obtaining device position input and/or an indication of input (e.g., user input) identifying a position of the mobile device within the vehicle. For example, network device 10 may receive and/or obtain an indication of input (e.g., user input) identifying a position of the mobile device within the vehicle. For example, the network device 10 may comprise means, such as processor 12, memory 14, communications interface 16, and/or the like, for receiving and/or obtaining an indication of input (e.g., user input) identifying a position of the mobile device within the vehicle. In various embodiments, the device position input and/or an indication of input (e.g., user input) identifying a position of the mobile device within the vehicle comprises identification of a selected vehicle portion within and/or at which the mobile device 20 is located within the vehicle 5. For example, an indication of input selecting a vehicle portion within and/or at which the mobile device 20 is positioned within the vehicle 5 may be received. For example, an indication of input (e.g., user input) identifying a position of the mobile device 20 within the vehicle may be configured to identify a vehicle portion selected via interaction with the IUI.

In an example embodiment, receiving the device position input and/or an indication of input (e.g., user input) identifying a position of the mobile device within the vehicle 5 does not require display of a position selection view of the IUI. For example, in an example embodiment, input may be received (e.g., via a microphone or other input device of the user interface 28) indicative of a user speaking a vehicle portion identifier corresponding to a selected vehicle portion. For example, audible input may be received via the user interface 28, processed (e.g., using a natural language processing engine, and/or the like), and a vehicle portion identifier may be extracted from the processed audible input. In an example embodiment, the audible input may be received unprompted (e.g., the receipt of the audible input may be identified as the device position input trigger) and/or the audible input may be received responsive to a visual or audible prompt for device position input. In another example, responsive to identifying a device position input trigger, it may be determined (e.g., by mobile device 20 and/or network device 10) whether a user profile associated with a user of the mobile device 20 (e.g., stored in memory 14, 24) comprises information identifying a vehicle portion preference. For example, the user profile may comprise a field corresponding to vehicle portion preference that is populated with a vehicle portion identifier, and/or the like. When it is determined that the user profile associated with a user of the mobile device 20 comprises information identifying a vehicle portion preference, block 404 may be skipped and receiving the indication of receipt of device position input may comprise accessing the information identifying a vehicle portion preference from the user profile.

At block 408, an offset corresponding to the selected vehicle portion within and/or at which the mobile device 20 is positioned within the vehicle 5 may be determined. For example, the offset may be a distance between a reference point, axis, and/or plane of the vehicle 5 and a representative point of the selected vehicle portion. For example, FIG. 6 illustrates a reference axis 640 and a selected vehicle portion

620 that is a column of pixels. The offset d between a representative point of the selected vehicle portion 620 and the reference axis 640 may be determined (e.g., in meters, feet, and/or the like). In an example embodiment, the offset d is a Euclidean distance between a representative point of the selected vehicle portion and the reference point, axis, and/or plane of the vehicle 5. In an example embodiment, the offset d is the shortest distance, a straight line distance, and/or normal distance between the representative point of the selected vehicle portion and the reference point, axis, and/or plane of the vehicle 5. For example, the offset d may be the length of a component of a line drawn from the representative point of the selected vehicle portion and the reference point, axis, and/or plane that is substantially perpendicular to the direction of motion and/or heading of the mobile device 20 and/or vehicle 5. In various embodiments, when the vehicle portion is a region of the vehicle 5, the representative point of the selected vehicle portion may be any point within that region of the vehicle 5. For example, a point located at the center of the region may be the representative point for that region. In an example embodiment, the vehicle portion is a column of pixels of the graphical representation of the vehicle (as shown in FIG. 6) and the offset d is the distance between the portion of the vehicle corresponding to the column of pixels of the graphical representation of the vehicle and the reference axis and/or plane. For example, the offset d may be the length of a line between the portion of the vehicle corresponding to the column of pixels of the graphical representation of the vehicle and the reference axis and/or plane and that is normal and/or substantially perpendicular to reference axis and/or plane. In some embodiments, in various scenarios, the determined offset d may be equal to and/or approximately zero. In some embodiments, in various scenarios, the determined offset d may be negative or positive, wherein the sign of the offset indicates whether the representative point of the selected vehicle portion is on the driver side or passenger side of the vehicle.

For example, the mobile device 20 and/or network device 10 may determine an offset between a representative point of the selected vehicle portion and the reference point, axis, and/or plane of the vehicle 5. For example, the mobile device 20 may comprise means, such as processor 22, memory 24, and/or the like, for determining an offset between a representative point of the selected vehicle portion and the reference point, axis, and/or plane of the vehicle 5. For example, the network device 10 may comprise means, such as processor 12, memory 14, and/or the like, for determining an offset between a representative point of the selected vehicle portion and the reference point, axis, and/or plane of the vehicle 5.

In various embodiments, the offset determined may be specific to the vehicle 5 (e.g., determined based on a model of the vehicle 5 that is specific to the make, model, and/or year of the vehicle 5). In an example embodiment, the offset determined may be specific to a type of the vehicle 5 (e.g., determined based on a model corresponding to an appropriate one of sedan, SUV, truck, etc.; a model corresponding to a brand of the vehicle 5; and/or the like). In an example embodiment, the offset that is determined is generic (e.g., based on generic vehicle model).

At one or more points during a vehicle usage period, a location of the vehicle may be determined. In various embodiments, a vehicle usage period may be the time that the vehicle is traversing a route, an ignition cycle of the vehicle, time from when a device position input trigger is identified and an (immediately) subsequent device position input trigger identified, and/or the like. For example, the location of the vehicle with respect to a coordinate system that is independent of the vehicle 5 may be determined at one or more times during the vehicle usage period. For example, the coordinate system may be World Geodetic System WGS-84 reference frame-based coordinate system, Parametry Zemli 1990 reference frame-based coordinate system, Galileo Terrestrial Reference Frame (GTRF) reference frame-based coordinate system, and/or other coordinate system that is independent of the vehicle. In various embodiments, the location of the vehicle may be determined, via the vehicle usage period, based on a location of the mobile device 20 that is onboard and/or within the vehicle 5. For example, the mobile device 20 may comprise circuitry (e.g., sensors 30, and/or the like) that enable the determination of the location of the mobile device with respect to the coordinate system that is independent of the vehicle 5. For example, the mobile device 20 may comprise circuitry that enables a GNSS-determined and/or GNSS-based location of the mobile device 20 to be determined. The location of the vehicle with respect to the coordinate system that is independent of the vehicle may then be determined, during the vehicle usage period, based at least in part on the location of the mobile device with respect to the coordinate system that is independent of the vehicle and the position of the mobile device 20 within the vehicle 5 as indicated by the selected vehicle portion.

In an example embodiment, a vehicle usage period is an ignition cycle of a vehicle, the time that the vehicle is traversing a route, during an instance of execution and/or operation of an application configured for performing positioning and/or navigation-related functions, and/or the like. For example, a device position input trigger may be identified at the beginning of the vehicle usage period and at one or more times during the vehicle usage period. When a device position input trigger is identified during a vehicle usage period, the process of blocks 402-408 may be repeated. For example, input indicating a changed position of the mobile device 20 within the vehicle 5 may be received and/or obtained; and a changed offset of the mobile device 20 from the reference point, axis, and/or plane may be determined. In subsequent determinations of the location of vehicle in the coordinate system that is independent of the vehicle 5 based on the location of the mobile device 20 with respect to the coordinate system, the changed offset may be used.

For example, at block 410, the location of the mobile device 20 may be determined, received, and/or obtained. For example, the mobile device 20 and/or network device 10 may determine, receive, and/or obtain a location of the mobile device 20 with respect to a coordinate system that is independent of the vehicle 5. For example, the mobile device 20 may comprise means, such as processor 22, memory 24, communications interface 26, sensors 30, and/or the like, and/or the network device 10 may comprise means, such as processor 12, memory 14, communications interface 16, and/or the like, for determining, receiving, and/or obtaining a location of the mobile device 20 with respect to a coordinate system that is independent of the vehicle 5. In an example embodiment, the location of the mobile device 20 is determined responsive to identifying (e.g., by the mobile device 20 and/or network device 10) of a localization trigger. For example, the localization trigger may be identified based on an application (e.g., operating on the mobile device 20 and/or network device 10) executing computer instructions for performing one or more positioning and/or navigation-related functions that use the location of the vehicle (in the coordinate system that is independent of the vehicle) as input. In various embodiments, the location of the mobile device 20 with respect to the coordinate system that is independent of the vehicle 5 is a GNSS-based and/or GNSS-determined location. In an example embodiment, the location of the mobile device 20 with respect to the coordinate system that is independent of the vehicle 5 is a GNSS-based and/or GNSS-determined location that has a sub-meter accuracy. For example, the location of the mobile device 20 with respect to the coordinate system that is independent of the vehicle 5 may be known and/or determined to sub-meter accuracy (e.g., with accuracy of less than one meter).

At block 412, the location of the vehicle 5 in the coordinate system that is independent of the vehicle 5 is determined. For example, the location of the vehicle 5 may be determined in a coordinate system that is independent of the vehicle 5 by the mobile device 20 and/or the network device 10. For example, the mobile device 20 may comprise means, such as processor 22, memory 24, and/or the like, for determining the location of the vehicle 5 in a coordinate system that is independent of the vehicle 5. For example, the network device 20 may comprise means, such as processor 12, memory 14, and/or the like, for determining the location of the vehicle 5 in a coordinate system that is independent of the vehicle 5.

In various embodiments, the location of the vehicle 5 in the coordinate system that is independent of the vehicle 5 is determined based on the location of the mobile device 20 in the coordinate system that is independent of the vehicle 5 and the position of the mobile device 20 within the vehicle 5 as indicated and/or represented by the vehicle portion selected for the vehicle usage period. For example, the location of the mobile device 20 with respect to the coordinate system that is independent of the vehicle 5 may be associated with the representative point of the vehicle portion selected for the current vehicle usage period. The location of the vehicle 5 with respect to the coordinate system that is independent of the vehicle 5 may then be determined based thereon. For example, heading of the vehicle 5 may be determined based on a heading and/or direction of travel of the mobile device 20. For example, the heading of the vehicle 5 may be approximately and/or substantially the same as the heading and/or direction of travel of the mobile device 20. Based on whether the representative point of the vehicle portion selected for the current vehicle usage period is in the middle of the vehicle, on the passenger side of the vehicle, and/or on the driver side of the vehicle, and the heading of the vehicle, the offset may be added to or subtracted from the location of the mobile device 20 to determine the location of the vehicle 5 with respect to the coordinate system that is independent of the vehicle 5.

For example, if the location of the mobile device 20 is given by latitude and longitude, the heading of the vehicle may be used to determine the component of the offset d that is in the north/south direction and the component of the offset d that is in the east/west direction. The component of the offset d in the north/south direction may be transformed into a change in latitude and the component of the offset d in the east/west direction may be transformed into a change in longitude. The location of the mobile device 20 may then be modified, adjusted, transformed, and/or the like based on the determined change in latitude and change in longitude to determine the location of the vehicle 5 as a latitude and longitude pair.

At block 414, the location of the vehicle 5 in the coordinate system that is independent of the vehicle 5 may be optionally provided. For example, if the mobile device 20 determined the location of the vehicle 5, the mobile device 20 may provide (e.g., transmit) the location of the vehicle 5 such that the network device 10 receives the location of the vehicle 5. For example, if the network device 10 determined the location of the vehicle 5, the network device 10 may provide (e.g., transmit) the location of the vehicle 5 such that the mobile device 20 receives the location of the vehicle 5. For example, the mobile device may comprise means, such as processor 22, memory 24, communications interface 26, and/or the like, and/or the network device 10 may comprise means, such as processor 12, memory 14, communications interface 16, and/or the like, for providing and/or receiving the location of the vehicle 5 in the coordinate system that is independent of the vehicle 5.

At block 416, the location of the vehicle 5 with respect to the coordinate system that is independent of the vehicle 5 may be used to perform a positioning and/or navigation-related function. For example, the mobile device 20 and/or the network device 10 may use the location of the vehicle 5 to perform a positioning and/or navigation-related function. For example, the mobile device 20 may comprise means, such as processor 22, memory 24, communications interface 26, user interface 28, and/or the like, for using the location of the vehicle to perform a positioning and/or navigation-related function corresponding to the vehicle and/or travel of the vehicle. For example, the network device 10 may comprise means, such as processor 12, memory 14, communications interface 16, user interface 18, and/or the like, for using the location of the vehicle to perform a positioning and/or navigation-related function corresponding to the vehicle and/or travel of the vehicle. Some non-limiting examples of positioning and/or navigation-related functions include localization, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, provision of safety alerts, display of an icon or symbol indicating the location of the vehicle 5 overlaid on a visualization of a portion of a digital map, and/or the like.

For example, FIG. 7 provides an example screen shot of a location display view 700 of an IUI, in accordance with an example embodiment. For example, the location display view 700 may comprise a visualization of a portion of a digital map 750. An icon or symbol 755 indicating the location of the vehicle 5 may be overlaid on the visualization of the portion of the digital map. For example, the location display view 700 may comprise a map layer including the visualization of the portion of the digital map and an icon layer including the icon or symbol indicating the location of the vehicle 5 with respect to the coordinate system that is independent of the vehicle 5. As can be seen in FIG. 7, embodiments of the present disclosure enable the icon or symbol 755 indicating the location of the vehicle 5 to be overlaid on the visualization of the portion of the visual map with lane level accuracy. Icon or symbol 760 illustrates, in an example scenario, how the location of the vehicle would be indicated on the visualization of the portion of the digital map if the location of the vehicle 5 were assumed to be the same as the location of the mobile device 20. As can be seen by comparing icons or symbols 755 and 760, embodiments of the present disclosure enable lane level accuracy in the performance of various positioning and/or navigation-related functions.

As noted above, the location of the vehicle with respect to the coordinate system that is independent of the vehicle and the use of the determined location of the vehicle to perform one or more positioning and/or navigation-related functions may be performed multiple times during a vehicle usage period. For example, the process may cycle back from block 416 to block 410 based on and/or responsive to identification of a localization trigger.

III. Technical Advantages

Various embodiments provide technical solutions to the technical problems of enabling determination of the location of a vehicle in a coordinate system that is independent of the vehicle to sub-meter accuracy based on a location of a mobile device that is within the vehicle. For example, various embodiments of the present invention address the generally previously unidentified and unaddressed technical problem of the uncertainty in the location of a vehicle 5 determined based on the location of a mobile device 20 onboard and/or within the vehicle 5. In particular, embodiments of the present invention provide technical solutions for mitigating the uncertainty in the location of a vehicle 5 determined based on the location of a mobile device 20 onboard and/or within the vehicle 5. Thus, embodiments of the present invention provide for more accurate performance of positioning and/or navigation-related functions that make use of the location of the vehicle 5 with respect to a coordinate system that is independent of the vehicle 5. For example, embodiments of the present disclosure may enable lane level localization of a vehicle 5, lane level display of a location of the vehicle 5, lane level routing of a vehicle 5, among other more accurately performed positioning and/or navigation-related functions. As such, various embodiments address technical problems that specifically arise in the technical field of performing positioning and/or navigation-related functions (e.g., with sub-meter accuracy) and therefore are particularly rooted in corresponding technologies.

IV. Example Apparatus

The network device 10 and/or mobile device 20 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, an Internet of things (IoT) item, and/or other device that can perform positioning and/or navigation-related functions, such as digital routing and map display. Additionally or alternatively, the network device 10 and/or mobile device 20 may be embodied in other types of computing devices, such as a server, a personal computer, a computer workstation, a laptop computer, a plurality of networked computing devices or the like, that are configured to update one or more map tiles, analyze probe points for route planning or other purposes, store and/or provide driving condition information/data, generate and provide sensor quality index tables and/or driving condition tables, and/or the like. In an example embodiment, a mobile device 20 is a smartphone, tablet, or other mobile computing entity and a network device 10 is a server. In an example embodiment, a mobile device 20 is an apparatus configured to provide a user with a route (e.g., via user interface 28).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network device 10 and/or mobile device 20 may be embodied by a computing entity and/or device. However, in some embodiments, the network device 10 and/or mobile device 20 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network device 10 and/or mobile device 20 may include a user interface 18, 28 that may, in turn, be in communication with the processor 12, 22 to provide output to the user, such as one or more navigable routes through a road network and/or venue, one or more notifications regarding traffic conditions along at least a portion of a route, and/or the output of one or more other positioning and/or navigation-related functions, and, in some embodiments, to receive an indication of a user input. As such, the user interface 18, 28 may include one or more output devices such as a display, speaker, and/or the like and, in some embodiments, may also include one or more input devices such as a keyboard, a mouse, a joystick, a touch screen/display, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network device 10 and/or mobile device 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network device 10 and/or mobile device 20 of an example embodiment, a navigation system may also include or have access to a geographic database. For example, in various embodiments, a network device 10 and/or mobile device 20 may comprise a component (e.g., memory 14, 24, and/or another component) that stores a digital map (e.g., in the form of a geographic database) comprising a first plurality of data records, each of the first plurality of data records representing a corresponding TME, wherein at least some of said first plurality of data records map information/data (e.g., the updated map information/data) indicating current traffic conditions along the corresponding TME. For example, the geographic database may include a variety of data (e.g., map information/data) utilized in various positioning and/or navigation-related functions such as constructing a route or navigation path, determining the time to traverse the route or navigation path, matching a geolocation (e.g., a GNSS-determined location) to a point on a map, a lane of a lane network, and/or link, one or more localization features and a corresponding location of each localization feature, and/or the like. For example, a geographic database may include road segment, segment, link, lane segment, or traversable map element (TME) data records, point of interest (POI) data records, localization feature data records, and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the network device 10 may be configured to modify, update, and/or the like one or more data records of the geographic database. For example, the network device 10 may modify, update, generate, and/or the like map information/data corresponding to TMEs, links, lanes, road segments, travel lanes of road segments, nodes, intersection, pedestrian walkways, elevators, staircases, and/or the like and/or the corresponding data records (e.g., to add or update updated map information/data including, for example, current traffic conditions along a corresponding TME), a localization layer (e.g., comprising localization features) and/or the corresponding data records, and/or the like.

In an example embodiment, the TME data records are links, lanes, or segments (e.g., maneuvers of a maneuver graph, representing roads, travel lanes of roads, streets, or paths, as can be used in the calculated route or recorded route information for determination of one or more personalized routes). The intersection data records are ending points corresponding to the respective links, lanes, or segments of the TME data records. The TME data records and the intersection data records represent a road network, such as used by vehicles, cars, bicycles, and/or other entities. Alternatively, the geographic database can contain path segment and intersection data records or nodes and connection information/data or other data that represent pedestrian paths or areas in addition to or instead of the vehicle road record data, for example.

The TMEs, lane/road/link/path segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network device 10 and/or device 20 in accordance with an example embodiment may determine the time to traverse a route that includes one or more turns at respective intersections more accurately.

V. Apparatus, Methods, and Computer Program Products

As described above, FIG. 4 illustrates a flowchart of a network device 10 and/or mobile device 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims.

Although specific terms are employed herein, they are used in a generic and descriptive sense only and not for purposes of limitation.

That which is claimed:

1. A method comprising:
   obtaining, by one or more processors, an indication of user input identifying a position of a mobile device within a vehicle;
   obtaining, by the one or more processors, a location of the mobile device with respect to a coordinate system that is independent of the vehicle;
   determining, by the one or more processors, an offset of the mobile device from at least one of a reference point, axis, or plane of the vehicle based on the position of the mobile device within the vehicle; and
   determining, by the one or more processors, a location of the vehicle with respect to the coordinate system that is independent of the vehicle by modifying the location of the mobile device with respect to the coordinate system that is independent of the vehicle based at least in part on the offset of the mobile device within the vehicle.

2. The method of claim 1, wherein the user input is received by the mobile device via user interaction with at least one input device of the user interface.

3. The method of claim 2, wherein the at least one input device being one of (a) a touch display or (b) a microphone.

4. The method of claim 1, wherein the input of user input is accessed from a user profile stored in a memory of at least one of (a) the mobile device or (b) accessible to the processor.

5. The method of claim 1, wherein the processor is a component of one of (a) the mobile device or (b) a network device.

6. The method of claim 1, wherein the location of the mobile device with respect to the coordinate system that is independent of the vehicle is determined by a global navigation satellite system (GNSS) sensor of the mobile device.

7. The method of claim 1, wherein the location of the mobile device with respect to the coordinate system that is independent of the vehicle is known to sub-meter accuracy.

8. The method of claim 1 further comprising at least one of:
   causing display of a symbol via an interactive user interface of a device indicating the location of the vehicle with respect to the coordinate system that is independent of the vehicle; or
   performing one or more positioning-related or navigation-related functions based on the location of the vehicle with respect to the coordinate system.

9. The method of claim 1, wherein the at least one of the reference point, axis, or plane is a center point, midline axis, or midline plane of the vehicle, respectively.

10. The method of claim 1 further comprising:
    obtaining an indication of further user input indicating a changed position of the mobile device within the vehicle;
    determining a changed offset of the mobile device from at least one of the reference point, axis, or plane of the vehicle based on the changed position of the mobile device within the vehicle;
    determining a changed location of the vehicle with respect to the coordinate system that is independent of the vehicle based at least in part on the location of the mobile device with respect to the coordinate system that is independent of the vehicle and the determined changed offset; and
    providing the changed location of the vehicle with respect to the coordinate system that is independent of the vehicle such that the user interface of the mobile device displays a symbol indicating the changed location of the vehicle with respect to the coordinate system that is independent of the vehicle.

11. The method of claim 1, wherein the indication of the user input identifies a region within the vehicle that the mobile device is positioned at within the vehicle and the position of the mobile device within the vehicle is determined based at least in part on the identified region.

12. The method of claim 11, wherein the position of the mobile device within the vehicle is determined to be a center point of the identified region.

13. The method of claim 1, wherein the location of the vehicle with respect to the coordinate system that is independent of the vehicle is determined by modifying the location of the mobile device with respect to the coordinate system that is independent of the vehicle based at least in part on the offset of the mobile device within the vehicle and a heading of the vehicle.

14. A method comprising:
    causing, by one or more processors, a mobile device to display an interactive user interface (IUI), the IUI comprising one or more interface features, the one or more interface features configured to enable selection of a vehicle portion corresponding to a position of the mobile device within a vehicle;
    receiving, by the one or more processors and via interaction with at least one of the one or more interface features, selection of a first vehicle portion, the selection of the first vehicle portion indicating that the mobile device is positioned within the first vehicle portion within the vehicle; and
    determining, by the one or more processors, a location of the vehicle with respect to a coordinate system that is independent of the vehicle based at least in part on an offset of the first vehicle portion from at least one of a reference point, axis, or plane of the vehicle.

15. The method of claim 14 further comprising at least one of:
    causing display of a symbol via the IUI indicating the location of the vehicle with respect to the coordinate system; or
    performing one or more positioning-related or navigation-related functions based on the location of the vehicle with respect to the coordinate system.

16. The method of claim 14, wherein at least one of:
    the one or more interface features comprise a slider, each position of the slider corresponding to a vehicle portion; or
    each of the one or more interface features each correspond to a vehicle portion that is a region corresponding to a portion of an interior of the vehicle.

17. The method of claim 14, wherein a granularity of the vehicle portions is determined based on user selection of a number of vehicle portions.

18. The method of claim 14, wherein the IUI comprises a representation of the vehicle and a granularity of the vehicle portions is determined based at least in part on a scale of the representation of the vehicle.

19. The method of claim 18, wherein the representation of the vehicle comprises a plurality of pixels and each pixel of the representation of the vehicle is an interface feature of the one or more interface features and corresponds to a respective vehicle portion.

20. An apparatus comprising at least one processor and at least one memory storing computer program code, the at least one memory and the computer program code are configured to, with the processor, cause the apparatus to at least:
- obtain an indication of user input identifying a position of a mobile device within a vehicle;
- obtain a location of the mobile device with respect to a coordinate system that is independent of the vehicle;
- determine an offset of the mobile device from at least one of a reference point, axis, or plane of the vehicle based on the position of the mobile device within the vehicle; and
- determine a location of the vehicle with respect to the coordinate system that is independent of the vehicle by modifying the location of the mobile device with respect to the coordinate system that is independent of the vehicle based at least in part on the offset of the mobile device within the vehicle.

* * * * *